US006643682B1

United States Patent
Todd et al.

(10) Patent No.: US 6,643,682 B1
(45) Date of Patent: Nov. 4, 2003

(54) PUBLISH/SUBSCRIBE DATA PROCESSING WITH SUBSCRIPTION POINTS FOR CUSTOMIZED MESSAGE PROCESSING

(75) Inventors: Stephen James Paul Todd, Winchester (GB); Malcolm David Ayres, Romsey (GB); Timothy Nicholas Holloway, Lyndhurst (GB); Simon Anthony James Holdsworth, Andover (GB); Marc-Thomas Schmidt, Eastleigh (GB); Michael George Taylor, Park Gate (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/510,465

(22) Filed: Feb. 22, 2000

(30) Foreign Application Priority Data

Sep. 22, 1999 (GB) ............................................. 9930732
Sep. 28, 1999 (GB) ............................................. 9922812

(51) Int. Cl.[7] .......................... G06F 15/16; G06F 17/30; G06F 9/46
(52) U.S. Cl. ........................... 709/202; 709/318; 707/10
(58) Field of Search ................................ 709/204, 225, 709/231, 238, 241, 318, 202; 707/3, 10; 700/128

(56) References Cited

U.S. PATENT DOCUMENTS

| 4,815,030 A | 3/1989 | Cross et al. |
| 5,550,984 A | 8/1996 | Gelb |
| 5,623,601 A | 4/1997 | Vu |
| 5,699,513 A | 12/1997 | Feigen et al. |
| 5,727,129 A | 3/1998 | Barrett et al. |
| 5,727,159 A | 3/1998 | Kikinis |
| 5,752,242 A | 5/1998 | Havens |
| 5,767,893 A | 6/1998 | Chen et al. |
| 5,768,528 A * | 6/1998 | Stumm ........................ 709/231 |
| 5,774,664 A | 6/1998 | Hidary et al. |
| 5,778,174 A | 7/1998 | Cain |

(List continued on next page.)

FOREIGN PATENT DOCUMENTS

EP 0759591 2/1997 ............. G06F/9/46

OTHER PUBLICATIONS

Graham, Ian S., HTML Source Book, Second Edition, A Complete Guide to HTML 3.0, Wiley Computer Publishing, John Wiley & Sons, Inc. New York, Chichester, Brisbane, Toronto, Singapore © 1996, Table Of Contents, Chapter 3—pp. 91–123; Chapter 6—pp. 351–375; Chapter 7—pp. 377–417; Chapter 8—pp. 450.

Primary Examiner—David Wiley
Assistant Examiner—Michael Delgado
(74) Attorney, Agent, or Firm—Jeanine S. Ray-Yarletts (57) ABSTRACT

A message broker data processing apparatus has a unit for receiving published messages on a topic from a publisher application; a unit for processing the received messages; and a unit for distributing the processed messages to subscriber applications; wherein the unit for distributing includes a plurality of subscription point data processing nodes, a first subscription point data processing node distributes messages to a subscriber application which has previously registered a subscription request identifying the first subscription point data processing node with the broker apparatus.

6 Claims, 5 Drawing Sheets

U.S. PATENT DOCUMENTS

| | | | |
|---|---|---|---|
| 5,867,651 A | | 2/1999 | Dan et al. |
| 5,870,605 A | * | 2/1999 | Bracho et al. ............... 709/318 |
| 5,873,084 A | * | 2/1999 | Bracho et al. ................. 707/10 |
| 5,878,231 A | | 3/1999 | Baehr et al. |
| 5,898,830 A | | 4/1999 | Wesinger, Jr. et al. |
| 5,905,872 A | | 5/1999 | DeSimone et al. |
| 5,954,793 A | * | 9/1999 | Stutman et al. ............. 709/204 |
| 5,974,417 A | * | 10/1999 | Bracho et al. ................. 707/10 |
| 6,021,443 A | * | 2/2000 | Bracho et al. ............... 709/241 |
| 6,154,781 A | * | 11/2000 | Bolam et al. ................ 709/238 |
| 6,182,143 B1 | * | 1/2001 | Hastings et al. ............ 709/231 |
| 6,189,045 B1 | * | 2/2001 | O'Shea et al. ............. 709/228 |
| 6,202,093 B1 | * | 3/2001 | Bolam et al. ................ 709/225 |
| 6,334,151 B1 | * | 12/2001 | Bolam et al. ................ 709/225 |
| 6,363,411 B1 | * | 3/2002 | Dugan et al. ............... 709/202 |
| 6,366,826 B1 | * | 4/2002 | Mead et al. ................ 700/128 |
| 6,405,191 B1 | * | 6/2002 | Bhatt et al. .................... 707/3 |
| 6,421,570 B1 | * | 7/2002 | McLaughlin et al. .......... 700/2 |

* cited by examiner

PUBLISH/SUBSCRIBE DATA PROCESSING WITH SUBSCRIPTION POINTS FOR CUSTOMIZED MESSAGE PROCESSING

FIELD OF THE INVENTION

The present invention relates to the field of data processing and more specifically to event notification data processing which distributes event messages from suppliers (called, hereinafter, "publishers") of data messages to consumers (called, hereinafter "subscribers") of such messages. While there are many different types of known event notification systems, the subsequent discussion will describe the publish/subscribe event notification system as it is one of the most common.

BACKGROUND OF THE INVENTION

Publish/subscribe data processing systems (and event notification systems in general) have become very popular in recent years as a way of distributing data messages (events) from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of. stock market data.

In such systems, publisher applications of data messages do not need to know the identity or location of the subscriber applications which will receive the messages. The publishers need only connect to a publish/subscribe distribution agent process, which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The subscribers need only connect to a distribution agent process.

Figure 1:
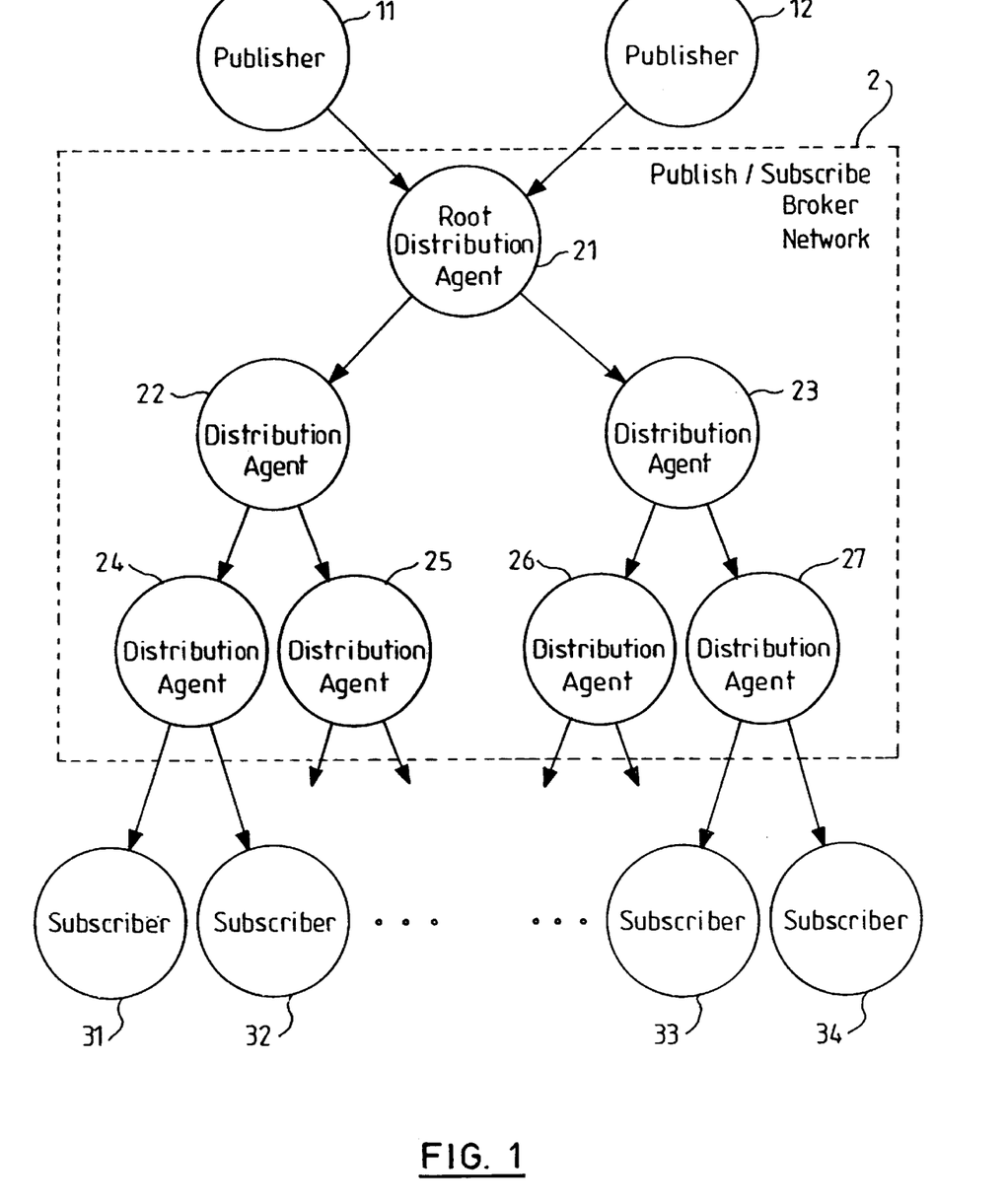
FIG. 1 is a block diagram showing a first architecture of a publish/subscribe data processing system to which the preferred embodiment of the present invention can be advantageously applied.

One such publish/subscribe system which is currently in use, and which has been developed by the Transarc Corp. (a wholly owned subsidiary of the assignee of the present patent application, IBM Corp.) is shown in FIG. 1. Publishers 11 and 12 connect to the publish/subscribe broker network 2 and send published messages to broker network 2 which distributes the messages to subscribers 31, 32, 33, 34. Publishers 11 and 12, which are data processing applications which output data messages, connect to broker network 2 using. the well known inter-application data connection protocol known as remote procedure call (or RPC) (other well known protocols, such as asynchronous message queuing protocols, can also be used). Each publisher application could be running on a separate machine, alternatively, a single machine could be running a plurality of publisher applications. The broker network 2 is made up of a plurality of distribution agents (21 through 27) which are connected in a hierarchical fashion which will be described below as a "tree structure". These distribution agents, each of which could be running on a separate machine, are data processing applications which distribute data messages through the broker network 2 from publishers to subscribers. Subscriber applications 31, 32, 33 and 34 connect to the broker network 2 via RPC in order to receive published messages.

Publishers 11 and 12 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker network 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams (this is known as "topic based" publish/subscribe, another well known model is called "content based publish/subscribe which involves matching publishers and subscribers by the content of the messages rather than by the topic). Likewise, subscribers provide the leaf distribution agents 31 through 34 with the name of the streams to which they would like to subscribe. In this way, the broker network 2 keeps track of which subscribers are interested in which streams so that when publishers publish messages to such streams, the messages can be distributed to the corresponding subscribers. Subscribers are also allowed to provide filter expressions to the broker network in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

The above-described publish/subscribe architecture provides the advantage of central co-ordination of all published messages, since all publishers must connect to the same distribution agent (the root) in order to publish a message to the broker network. For example, total ordering of published messages throughout the broker network is greatly facilitated, since the root can easily assign sequence numbers to each published message on a stream. However, this architecture also has the disadvantage of publisher inflexibility, since each publisher is constrained to publishing from the single root distribution agent, even when it would be much easier for a publisher to connect to a closer distribution agent.

In the FIG. 1, a publisher application 11, running on one computer, is, for example, a supplier of live stock market data quotes. That is, publisher application 11 provides frequent messages stating the present value of share prices. In this example, publisher application 11 is publishing messages on a stream called "stock" which has already been configured in the broker network 2. As is well known, when publisher 11 wishes to publish a stock quote message to stream "stock", publisher 11 makes an RPC call to the root distribution agent 11 which is at the top level of the broker network tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus, whenever publisher 11 publishes a data message to stream "stock" the distribution tree structure of broker network 2 channels the message down through the root distribution agent 21, through any intermediary distribution agents (e.g., 22 in the example of FIG. 1) and through the leaf distribution agent 24 to the subscriber 32. This involves a series of RPC calls being made between each successive circle in the diagram of FIG. 1 connecting publisher 11 and subscriber 32 (i.e., 11 to 21, 21 to 22, 22 to 24 and 24 to 32).

Figure 2:
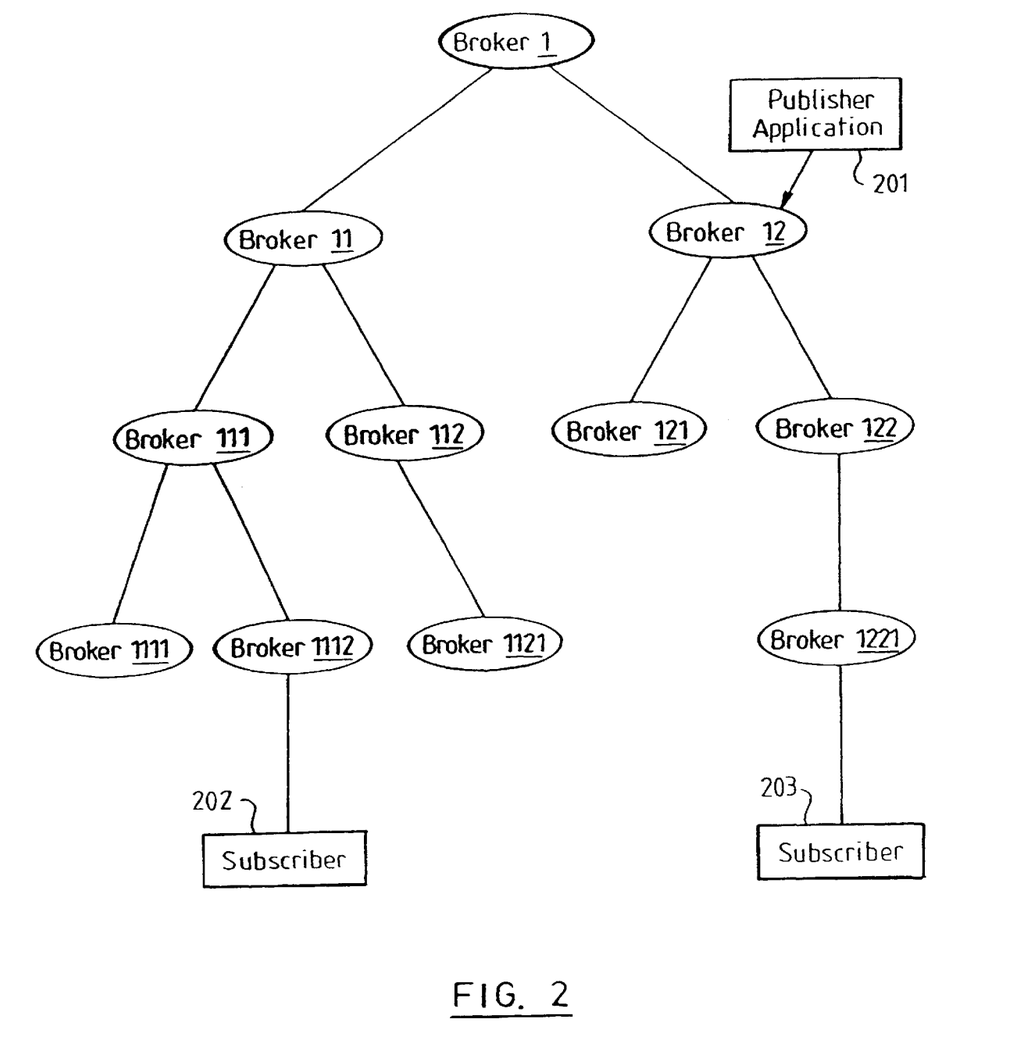
FIG. 2 is a block diagram showing a second architecture of a publish/subscribe data processing system to which the preferred embodiment of the present invention can be advantageously applied.

FIG. 2 shows a different publish/subscribe architecture where publisher applications can publish messages to the broker network by directly communicating with any one of a plurality of distribution agents (brokers). For example, publisher application 201 is shown communicating directly with Broker 12. There is no requirement in this architecture that all publisher applications communicate directly with a top (or root) distribution agent. Publisher application 201 can potentially communicate directly with any of the distribution agents shown in FIG. 2, in the described examples below it will be shown communicating directly with Broker 12.

Subscriber applications 202 and 203 would like to receive messages on the stream/topic that publisher application 201 is publishing on. Thus, subscriber applications 202 and 203 communicate directly with Brokers 1112 and 1221, respectively, to provide subscription data thereto informing the broker hierarchy of their desire to receive such published messages. Since the publisher application 201 is allowed to communicate directly with any of a plurality of distribution agents, the subscription data entered by the subscriber applications must be propagated throughout the broker network to each Broker shown in FIG. 2. This way, no matter which distribution agent the publisher application 201 happens to communicate directly with, the published messages will be able to be routed to the subscriber applications 202 and 203.

Publish/subscribe broker systems have commonly been integrated into multi-function message broker systems which are used to inter-connect applications which may be on heterogeneous platforms and may use different message formats. For example, Saga Software of Reston, Virginia (USA) (www.sagasoftware.com) have such a message broker product called "Sagavista" (a trademark of Saga Software). Further, Tibco Software Inc. of Palo Alto, Calif. (USA) (www.tibco.com) also have such a message broker called "TIB/Message Broker" (both "TIB" and "TIB/Message Broker" are trademarks of Tibco). In these multi-function message brokers, a set of pluggable data processing nodes is provided, with each node being dedicated to a specific data processing task, such as message format transformation, publish/subscribe message distribution, and a rules engine for deciding (based on a plurality of pre-defined rules) where an incoming message should be routed.

In these multi-function message broker products, when a subscriber application registers a subscription request with the broker, the subscriber application sends the subscription request to a publish/subscribe broker node specifying the topic of the desired subscription. The publish/subscribe broker node (usually in cooperation with a plurality of other such publish/subscribe broker nodes) then ensures that any published messages on that topic are sent to the subscriber application. Different subscribers may wish to receive the same published messages but in different message formats. For example, a subscriber in the United States may want to know IBM's stock price per share in US dollars while another subscriber in the United Kingdom may want to know IBM's stock price in UK (British) pounds.

In order to accommodate such format desires of various subscribers, the message broker would have to modify the topic after having performed a format transformation so that a subscriber can subscribe to this modified topic (rather than the original topic that the publisher published on) in order to receive the format-transformed messages. Alternatively, the publishers would have to publish the same messages in different formats(with each format having its own topic), thus doing away with the need for the broker to do the format transformation. Because the topic needs to correspond to the format in both of these cases, this can cause many problems. For example, it is very useful to carry out access control on a topic basis. That is, when deciding which subscribers can have access to which published messages, it is very useful to be able to use the topics of the messages to make such access control decisions. However, when the topics must be different for essentially the same group of messages because of format changes, such access control decisions become much more complex.

It would be clearly desirable to be able to use the same topic for a variety of different message formats in a message broker, but the present state of the art does not allow for this.

SUMMARY OF THE INVENTION

According to one aspect, the present invention provides a message broker data processing apparatus having: a unit for receiving published messages on a topic from a publisher application; a unit for processing the received messages; and a unit for distributing the processed messages to subscriber applications; wherein the unit for distributing includes a plurality of subscription point data processing nodes, a first subscription point data processing node distributes messages to a subscriber application which has previously registered a subscription request identifying the first subscription point data processing node with the broker apparatus.

Preferably, the unit for processing includes at least one message flow data processing node which performs a specific data processing operation; and wherein the apparatus further has: a unit for performing a detection that no subscriber application has registered a subscription request identifying a particular subscription point data processing node with the broker apparatus; and a unit for, in response to the detection that no subscriber application has registered a subscription request identifying a particular subscription point data processing apparatus, disabling the execution of a message flow data processing node which is uniquely associated with the particular subscription point data processing node.

According to a second aspect, the present invention provides a data processing method of carrying out the functionality discussed above with respect to the first aspect.

According to a third aspect, the present invention provides a computer readable storage medium having a computer program stored on it which, when executed on a computer system, carries out the functionality of the data processing method of the second aspect of the invention.

Thus, the present invention provides a message broker having a publish/subscribe capability where subscribers can receive messages in their desired formats without the need for either the broker or the publishers to modify the topic names used by the publisher, broker and subscriber. Instead, the publisher, broker and subscriber can use the same topic name even though the messages sent under this topic will be of differing formats. The presence of multiple subscription points within the broker provides for this ability.

As one advantage of the invention, access control can thus be easily carried out using the topic name. Further, the publisher application does not need to publish the same messages on a plurality of topics in order to accommodate subscribers who want publications in differing formats, thus decoupling the publisher application from having to deal with the varying desires of subscribers. The publisher need only publish messages in the format most convenient to that publisher.

Further, according to a preferred aspect of the present invention, a detection is performed that there are no subscriber applications which have registered a subscription naming a particular subscription point. In response to this detection, a message flow data processing node that is uniquely associated with that particular subscription point is prevented from being executed. This greatly saves on the amount of processing that is carried out. There is no need for such message flow data processing node(s) to execute because such message flow data processing nodes(s) is/are only processing messages which will be sent to a particular subscription point and since no subscriber application has registered a subscription request naming that subscription point, then there is no need for such message flow data processing node(s) to execute.

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 3:
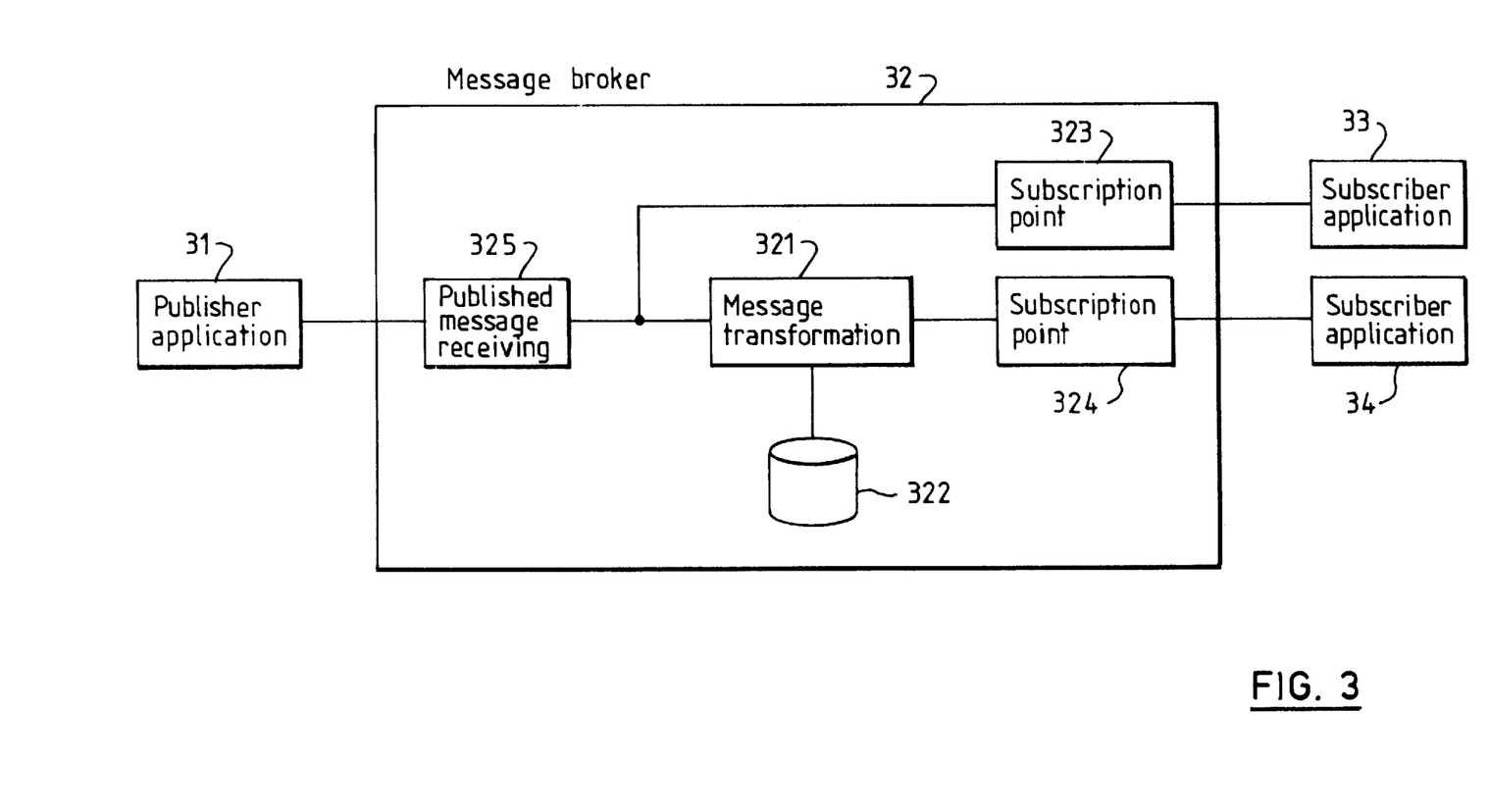
FIG. 3 is a block diagram showing an exemplary message broker according to a preferred embodiment of the present invention.

In FIG. 3 a message broker 32 receives published messages on a topic called "IBM stock" from a publisher application 31 (which is an application running at a major stock exchange) and distributes such published messages to subscriber applications 33 and 34 (which are two different stock broking agencies), each of which have previously registered subscriptions to the topic "IBM stock". In this example, the publisher application, broker and subscriber applications are all running on separate machines (and are thus interconnected via a network which is not shown in FIG. 3). In other embodiments, however, two or more of the applications (e.g., the publisher and the broker) could be running on the same machine. Further, as was explained above, the broker 32 is most likely running on a plurality of machines.

When the published messages are received into the message broker 32 at a published message receiving data processing node 325, they are sent to a message transformation data processing node 321 which performs the function of transforming the format of the published messages so that the IBM stock prices, which are originally published in US dollars, are converted to UK pounds. The message transformation node 321 accesses local storage 322 in order to determine the current exchange rate of US dollars to UK pounds (this exchange rate is updated at the beginning of every business day). After having their US dollar amounts converted to UK pounds, the messages are output from the message transformation node 321 and received at a subscription point processing node 324.

A subscription point data processing node (or "subscription point" for short) is an instance of a publish/subscribe matching engine which performs the function of looking at the topics in previously received subscription requests (received from subscribers) and determining whether the topic in an incoming message (just received from a publisher application) matches the topic of any of the previously received subscription requests. For any subscriptions that match, the subscription point data processing node distributes the published message to the subscriber application(s) which had entered the subscription requests.

Back to FIG. 3, the subscription point processing node 324 determines (e.g., by accessing local storage 322) that subscriber application 34 has previously entered a subscription on the topic "IBM stock". Thus, subscription point processing node 324 distributes the published messages to subscriber application 34.

Upon entering the broker 32, published messages from publisher 31 also take another path bypassing the message transformation data processing node 321. Specifically, the published messages also are sent directly to subscription point data processing node 323 (which is separate from subscription point data processing node 324 discussed earlier). Subscription point data processing node 323 then performs a publish/subscribe topic matching operation and determines that subscriber application 33 has previously entered a subscription request to the topic "IBM stock". Thus, subscription point processing node 323 distributes the published messages to subscriber application 33.

When subscriber application 33 registered its subscription to the topic "IBM stock" with the broker 32, subscriber application 33 provided the broker not only with the name of the topic "IBM stock" but also with the identity of subscription point 323 as the desired subscription point in the message flow of data processing nodes within the broker 32. This informs the broker 32 that subscription point 323 should be used to satisfy subscriber application 33's subscription request. Subscriber application 33 has selected subscription point 323 because subscriber application 33 is being run by a stock broker agency located in the United States and thus subscriber application 33 desires to receive publications on topic "IBM stock" with the stock prices quoted in US dollars. Because the message flow through the data processing nodes of message broker 32 for subscription point 323 bypasses the message transformation node 321, the original format (stock prices in US dollars) of the published messages from publisher application 31 is maintained and the subscriber application 33 receives such published messages without message transformation.

On the other hand, when subscriber application 34 registered its subscription to the topic "IBM stock" with the broker 32, subscriber application 34 provided the broker not only with the name of the topic "IBM stock" but also with the identity of subscription point 324 as the desired subscription point in the message flow of data processing nodes within the broker 32. This informs the broker 32 that subscription point 324 should be used to satisfy subscriber application 34's subscription request. Subscriber application 34 has selected subscription point 324 because subscriber application 34 is being run by a stock broker agency located in the United Kingdom and thus subscriber application 34 desires to receive publications on topic "IBM stock" with the stock prices quoted in UK pounds. Because the message flow through the data processing nodes of message broker 32 for subscription point 324 includes the message transformation node 321, the original format (stock prices in US dollars) of the published messages from publisher application 31 is converted into UK pounds and the subscriber application 34 receives such published messages after having had the format of such messages transformed.

Thus, by the use of a plurality (two in FIG. 3) of subscription point data processing nodes in a message broker, subscriber applications can be provided with published messages in a message format selected by the subscriber without having to use different topics (the topic "IBM stock" is the same for both subscription points 323 and 324). This allows access control to be easily carried out on a topic basis. For example, the broker can perform a security measure on both subscriber applications 33 and 34 by simply checking whether the requested topic "IBM stock" of their subscription requests is a topic which has previously been determined as acceptable for subscribers 33 and 34 from a security standpoint.

The message broker illustrated in FIG. 3 can be optimized for situations when no subscriber application has registered a subscription with a particular subscription point (e.g., subscription point 324). In such a situation, the broker system software detects that there are no subscriber applications which have registered a subscription specifying subscription point 324 (e.g., assume that subscriber application 34 has not registered a subscription specifying subscription point 324). In such a situation, there is no need for message flow data processing node 321 (the message transformation node) to be executed, because node 321 is uniquely associated with subscription point 324. That is, node 321 does not feed messages to any other subscription point besides subscription point 324. Thus, the broker system software disables the execution of node 321 in response to the detection described above.

Figure 4:
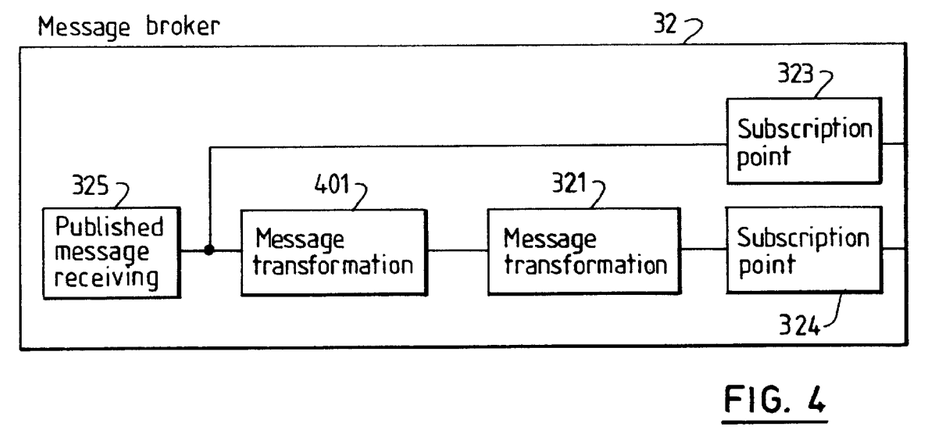
FIG. 4 is a block diagram showing another exemplary message broker according to a preferred embodiment of the present invention.

This disabling is preferably applied recursively in the series of message flow nodes. That is, assume that there is another message transformation node 401 located before the transformation node 321 (see FIG. 4). Once the broker system software detects that there are no subscriber applications which have registered a subscription naming subscription point 324, not only is message transformation node 321 dynamically disabled as described above, but also message transformation node 401 is disabled. That is, once node 321 is disabled, node 401 is no longer feeding any enabled nodes, and thus node 401 can also be disabled. This recursion can go indefinitely backwards. Any transformation node which is not feeding any enabled node may be disabled, regardless of how many disabled nodes it is feeding. It should be noted, however, that any node which performs an additional function besides outputting messages (e.g., warehouse nodes write data concerning incoming messages to a database as well as outputting incoming messages) must not be disabled.

Figure 5:
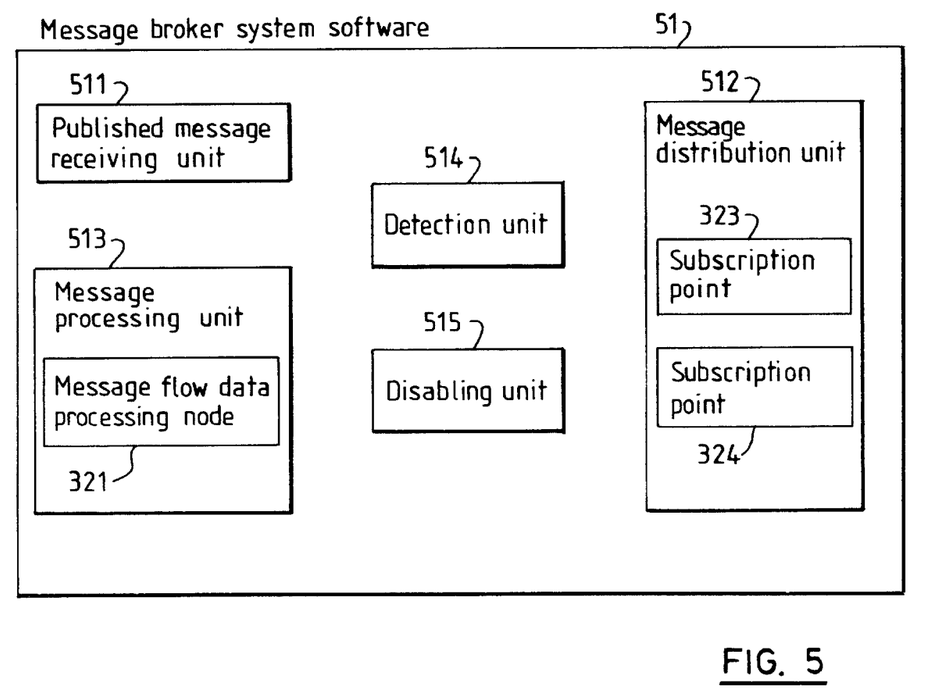
FIG. 5 shows the message broker system software components, according to a preferred embodiment of the present invention.

The various software components of the message broker system software 51 are illustrated in FIG. 5, and include a published message receiving unit 511, a message distributing unit 512, a message processing unit 513, a detecting unit 514 and a disabling unit 515. The published message receiving unit 511 receives published messages from publisher applications. The message distributing unit 512 distributed messages to subscriber applications (via the subscription points discussed above). The message processing unit 513 performs various data processing operations on messages (via the message flow data processing nodes discussed above). The detection unit 514 detects when no subscriber applications have registered subscriptions with the subscription points (as discussed above). Finally, the disabling unit 515 disables message flow data processing nodes in response to the detection unit 514 (as discussed above). These components could be all running on the same machine or some of the components running on different machines (and thus inter-communicating via a network).

Applicant knows of prior art relevant to this latter optimization in the field of software compilers. Specifically, a program computes the value of variables but does not subsequently use (reference) the computed value. (Typically, the compiler builds a "network" of variables, how they are computed and how they are referenced). The optimization suppresses the computation of variables that are not referenced. However, Applicant knows of no prior art in the message broker art. In the publish/subscribe broker software art, subscriptions are dynamic and thus Applicant's optimization results in a highly dynamic optimization.

Figure 6:
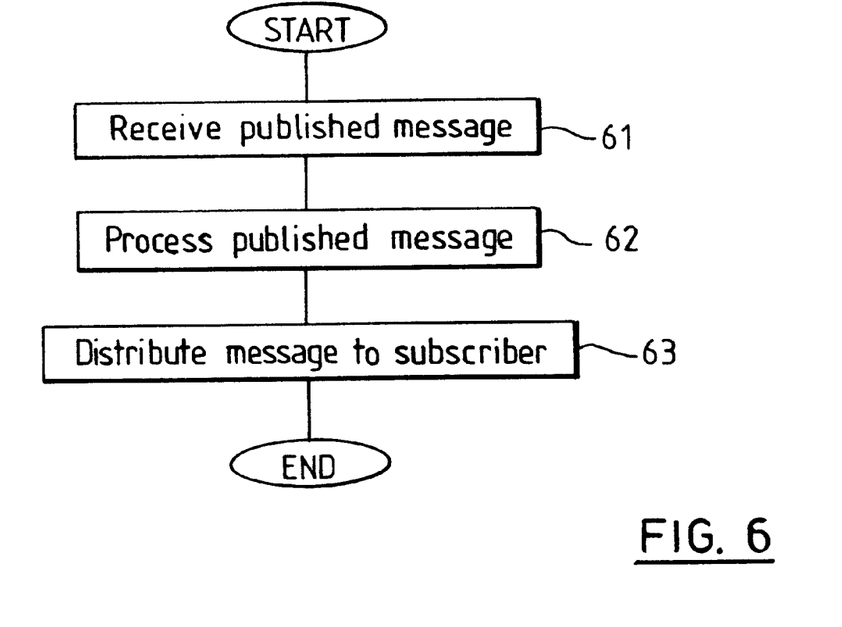
FIG. 6 is a flowchart showing the method steps carried out by the message broker system software components according to a preferred embodiment of the present invention.

The operational steps carried out by the message broker system software of the preferred embodiment will now be discussed with reference to FIG. 6.

At step 61, a published message is received by the published message receiving unit 511. At step 62, the published message is processed by the message processing unit 513 (which, in the example of FIG. 3, includes having the format of the message transformed by the message transformation node 321). At step 63, the message is distributed to a subscriber, which includes sending the message to a subscription point node (e.g., 324 in FIG. 2).

Figure 7:
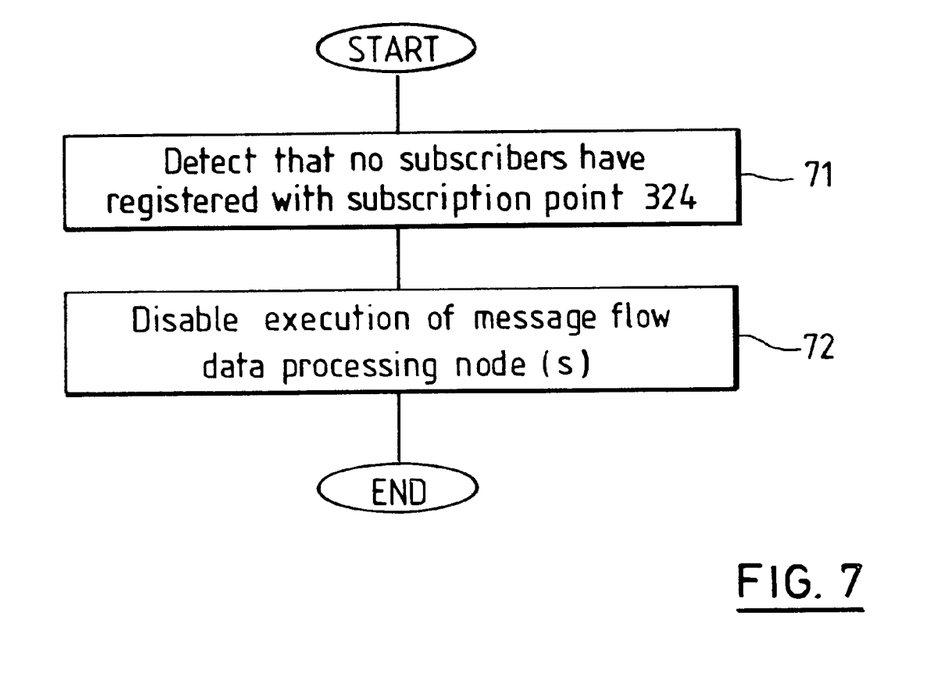
FIG. 7 is a flowchart showing the method steps carried out by the message broker software components in order to disable the execution of unused message flow data processing nodes, according to a preferred embodiment of the present invention.

The operational steps involved in disabling message flow data processing nodes will now be described with reference to the flowchart of FIG. 7.

At step 71, the detecting unit 514 detects that there are no subscriber applications which have registered a subscription naming subscription point 324 as the subscription point via which the subscriber application would like to receive published messages. At step 72, once the detection is carried out at step 71, the disabling unit 515 disables the execution of the message flow data processing node 321 which is uniquely associated with subscription point 324, since there is no need for node 321 to be executed. At step 72, the disabling unit 515 preferably also disables any other nodes (e.g., node 401 of FIG. 4) which are uniquely associated with subscription point 324.

The use of subscription points in message flows through the broker is not limited to message format transformation. Such subscription points could also be used to implement different filters on subscription topics. For example, message transformation data processing node 321 could be replaced with a topic filtering data processing node which carries out the function of filtering any published messages on topic "IBM stock" where the stock price is greater than 100 US dollars per share. That is, the filtering data processing node examines the stock price in each published message on topic "IBM stock" and only if the stock price is greater than 100 dollars per share is the published message allowed to pass through the filtering node. The published messages that make it through the filtering node are then sent to subscription point data processing node 324 which performs a topic matching function (as described above) and distributes the published messages to subscriber application 34. In this case, subscriber application 34 is being run by a US-based stock broker agency which is only concerned with messages concerning IBM stock if the IBM stock price per share is greater than 100 U.S. dollars.

The message transformation node 321 could include transformation by one or more of (a) restructure, (b) computation, (c) augmentation by database lookup. Indeed, any node whose only effect is to produce output messages.

A system may include multiple brokers each of which provides an equivalent set of multiple subscription points. These brokers are arranged as described earlier for publish/subscribe systems so that a subscriber subscribing to a particular subscription point receives the same set of messages regardless of the broker to which the subscription is made. Each broker subscribes to the subscription points of other brokers on behalf of client subscribers. Resulting interbroker messages all flow multiplexed onto a single communication channel (e.g. MQSeries queue) between two given connected brokers, regardless of the subscription point to which the message belongs. The source broker tags the interbroker message with header information indicating the subscription point to which the message belongs. The receiving broker uses the header tag to publish the messages to all subscribers at the given equivalent subscription point on the receiving broker.

Besides being embodied in a data processing apparatus and a data processing method, as described above, the present invention can also be embodied as a computer program product for use with a computer system. Such an implementation may comprise a series of computer readable instructions either fixed on a tangible medium, such as a computer readable media, e.g., diskette, CD-ROM, ROM, or hard disk, or transmittable to a computer system, via a modem or other interface device, over either a tangible medium, including but not limited to optical or analog communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable media with accompanying printed or electronic documentation, e.g., shrink wrapped software, pre-loaded with a computer system, e.g., on a system ROM or fixed disk, or distributed from a server or electronic bulletin board over a network, e.g., the Internet or World Wide Web.

We claim:

1. A message broker data processing apparatus comprising:

means for receiving published messages on a topic from a publisher application;

means for processing the received messages; and means for distributing the processed messages to subscriber applications;

wherein the means for distributing includes a plurality of subscription point data processing nodes, a first subscription point data processing node distributes messages to a first subscriber application which has previously registered a subscription request identifying the first subscription point data processing node and identifying said topic With the broker apparatus, and a second subscription point data processing node distributes messages to a second subscriber application which has previously registered a subscription request identifying the second subscription point data processing node and identifying said topic with the broker application;

wherein said first subscription point data processing node receives the published messages before the published messages have been processed by the means for processing and said second subscription point data processing node receives the published messages after the published messages have been processed by the means for processing; and wherein the means for processing includes at least one message flow data processing node which performs a specific data processing operation; and wherein the apparatus further comprises:

means for performing a detection that no subscriber application has registered a subscription request identifying a particular subscription point data processing node with the broker apparatus; and means for, in response to the detection that no subscriber application has registered a subscription request identifying a particular subscription point data processing apparatus, disabling the execution of a message flow data processing node which is uniquely associated with the particular subscription point data processing node.

2. The apparatus of claim 1 wherein said apparatus communicates with a subscriber application over the Internet and wherein at least one of the subscriber applications and the publisher application runs in conjunction with a World Wide Web browser.

3. The apparatus of claim 1 wherein at least one of the message flow data processing nodes is a message transformation node.

4. The apparatus of claim 1 further wherein the means for disabling disables each message flow data processing node which is uniquely associated with the particular subscription point data processing node.

5. A message broker data processing method comprising steps of:

(a) receiving published messages on a topic from a publisher application;

(b) processing the received messages; and (c) distributing the processed messages to subscriber applications;

wherein the distributing step involves a plurality of subscription point data processing nodes, a first subscription point data processing node distributes messages to a first subscriber application which has previously registered a subscription request identifying the first subscription point data processing node and identifying said topic with the broker, and a second subscription point data processing node distributes messages to a second subscriber application which has previously registered a subscription request identifying the second subscription point data processing node and identifying said topic with the broker;

wherein said first subscription point data processing node receives the published messages before the published messages have been processed at step (b) and said second subscription point data processing node receives the published messages after the published messages have been processed at step (b); and wherein the processing step involves at least one message flow data processing node which performs a specific data processing operation; and wherein the method further comprises steps of:

performing a detection that no subscriber application has registered a subscription request identifying a particular subscription point data processing node with the broker; and in response to the detection that no subscriber application has registered a subscription request identifying a particular subscription point data processing node, disabling the execution associated with the particular subscription point data processing node.

6. A computer program product, stored on a computer readable storage medium for, when run on a computer system, instructing the computer system to carry out the method of claim 5.

* * * * *